(12) United States Patent
Lu et al.

(10) Patent No.: US 9,919,345 B1
(45) Date of Patent: Mar. 20, 2018

(54) SYSTEM FOR SORTING FRUIT

(71) Applicant: The United States of America, as represented by the Secretary of Agriculture, Washington, DC (US)

(72) Inventors: Renfu Lu, Okemos, MI (US); Anand Kumar Pothula, Okemos, MI (US); Akira Mizushima, West Des Moines, IA (US); Mario Vandyke, Conklin, MI (US); Zhao Zhang, Okemos, MI (US)

(73) Assignee: The United States of America, as represented by The secretary of Agriculture, Washington, DC (US)

( * ) Notice: Subject to any disclaimer, the term of this patent is extended or adjusted under 35 U.S.C. 154(b) by 0 days.

(21) Appl. No.: 15/256,931

(22) Filed: Sep. 6, 2016

(51) Int. Cl.
| | | |
|---|---|---|
| *B07C 5/02* | (2006.01) | |
| *B07C 1/04* | (2006.01) | |
| *B07C 5/342* | (2006.01) | |
| *B65G 33/06* | (2006.01) | |
| *B07C 5/10* | (2006.01) | |

(52) U.S. Cl.
CPC ............. *B07C 1/04* (2013.01); *B07C 5/02* (2013.01); *B07C 5/10* (2013.01); *B07C 5/342* (2013.01); *B65G 33/06* (2013.01); *B07C 2501/009* (2013.01)

(58) Field of Classification Search
CPC .... B07C 1/02; B07C 1/04; B07C 5/02; B07C 5/10; B07C 5/342; B07C 5/3422; B65G 33/06; B65G 37/005
See application file for complete search history.

(56) References Cited

U.S. PATENT DOCUMENTS

| | | | | |
|---|---|---|---|---|
| 5,513,740 | A * | 5/1996 | Affeldt | B07C 5/02 198/460.1 |
| 6,888,082 | B1 * | 5/2005 | Blanc | B07C 5/3422 209/540 |
| 8,662,314 | B2 * | 3/2014 | Jones | B07C 5/362 209/44.2 |
| 2007/0000823 | A1 * | 1/2007 | Greenbank | B07B 13/07 209/621 |
| 2009/0139832 | A1 * | 6/2009 | Sato | B65G 33/06 198/358 |

* cited by examiner

*Primary Examiner* — Mark J Beauchaine
(74) *Attorney, Agent, or Firm* — John D. Fado; Robert D. Jones

(57) ABSTRACT

As fruit (preferably apples) are harvested, the fruit is placed on a conveyor that conveys the fruit to a fruit singulating section. In the singulating section, the fruit is directed into slots in a lane formed by two cooperating helical drives. The helical drives rotate the fruit and convey the fruit into an imaging chamber where a camera acquires an image of the fruit. The fruit image is evaluated by a processor in communication with the camera. The fruit is then directed into a rotary sorter which sorts the fruit based on the image evaluation by the processor.

18 Claims, 5 Drawing Sheets

SYSTEM FOR SORTING FRUIT

FIELD OF THE INVENTION

The disclosed system relates to a method of sorting fruit. Specifically, the method and apparatus described herein relates to a mobile harvest-point machine vision system of singulating apples, acquiring a digital image of the apples, and then sorting the apples via a rotary sorter.

BACKGROUND OF THE INVENTION

Currently, after fruit (for example apples) is harvested, the fruit is stored in a controlled atmosphere or refrigerated air environment for up to 12 months, until the fruit is ready for sorting into different quality grades and packing into boxes for the market. It is estimated that typically 10% to 40% of harvested apples are not suitable for the fresh fruit market—usually due to defects or issues with fruit quality. Removing defective or inferior apples during the harvest process would achieve significant cost savings in post-harvest storage and packing.

Further, storing defective fruit with otherwise uncontaminated fruits frequently results in the spread of disease and pests. Early identification and removal of defective fruit significantly reduces postharvest disease/pest problems. Machine vision systems are an effective tool for identifying defective fruit. Machine vision systems also create a storable and traceable record that permits growers and packing-houses to have detailed information (e.g., size, color, tree and orchard, etc.) about the fruit in each harvested lot/batch—which greatly enhances inventory management and product traceability. However, currently available machine vision systems are fragile, complex, and too bulky and expensive—and are not generally suitable for the field/harvest environment. There are currently no mobile harvest-point machine vision-based systems available to apple producers.

The need exists for a fruit harvesting system that quickly and efficiently separates defective fruit from fruit intended for the fresh produce market—and is functional in a harvest environment. The system described herein comprises a modular harvest-point machine vision system that singulates and records individual fruits, and then separates the fruit into various bins based on the grade and quality of the fruit. The system described herein is fast, relatively compact, and durable enough to function under harvest conditions.

SUMMARY OF THE INVENTION

This disclosure is directed to a fruit sorting system. The system comprises a pair of helical drives that are structured to singulate the fruit. After the fruit is singulated, the helical drives continuously rotate the fruit and convey the fruit into an imaging chamber where an imaging device records images of the fruit. A processor (structured to receive images of the fruit from the imaging device) evaluates the images and communicates the evaluation to a rotary sorter so that after the fruit is deposited in the sorter, the sorter rotates to place the fruit in a designated location corresponding with the image evaluation by the processor.

DETAILED DESCRIPTION OF PREFERRED EMBODIMENTS

Figure 1:
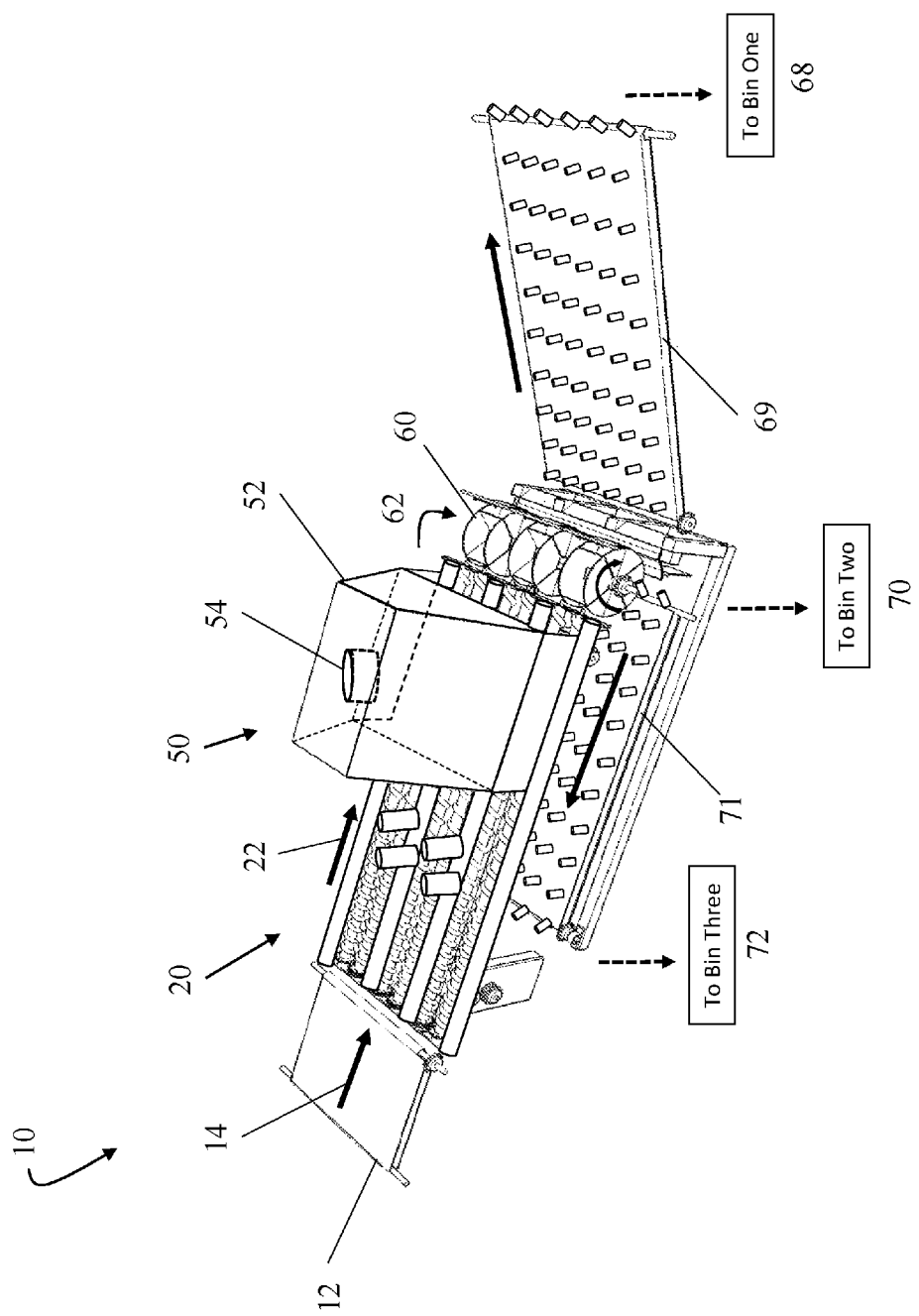
FIG. 1 is an elevational view of the machine vision-based processing system.

As generally shown in FIG. 1, the system described herein comprises a machine vision fruit sorting system 10. In the preferred embodiment, the fruit that is sorted is apples. The system 10 is preferably deployed (e.g. installed on a mobile harvest platform) in an apple orchard at harvest time. The apples may be picked or otherwise dislodged from apple trees by any means known in the art.

For the purposes of this disclosure, a "machine vision-based system" is a system wherein at least one digital image of a product is acquired and evaluated, and a subsequent action (such as sorting) is taken as a result of the evaluation of the digital image.

In operation, as generally shown in FIG. 1, the apples are placed on a conveyor belt 12 where the apples move in the direction of the arrow 14 to an apple singulating section 20. The apple singulating section 20 "singulates" the apples (i.e. places the apples in a tandem linear arrangement). Once the apples are singulated, they advance in the direction of the arrow 22 to an imaging chamber 50 where an image of each apple is recorded. The apples then move out of the imaging chamber 50 in the direction of the arrow 62 and into a rotary sorter 60, where the apples are sorted either directly into a selected bin 70, or on to a conveyor 69, 71, which conveys the apples into a selected bin 68, 72.

Figure 2:
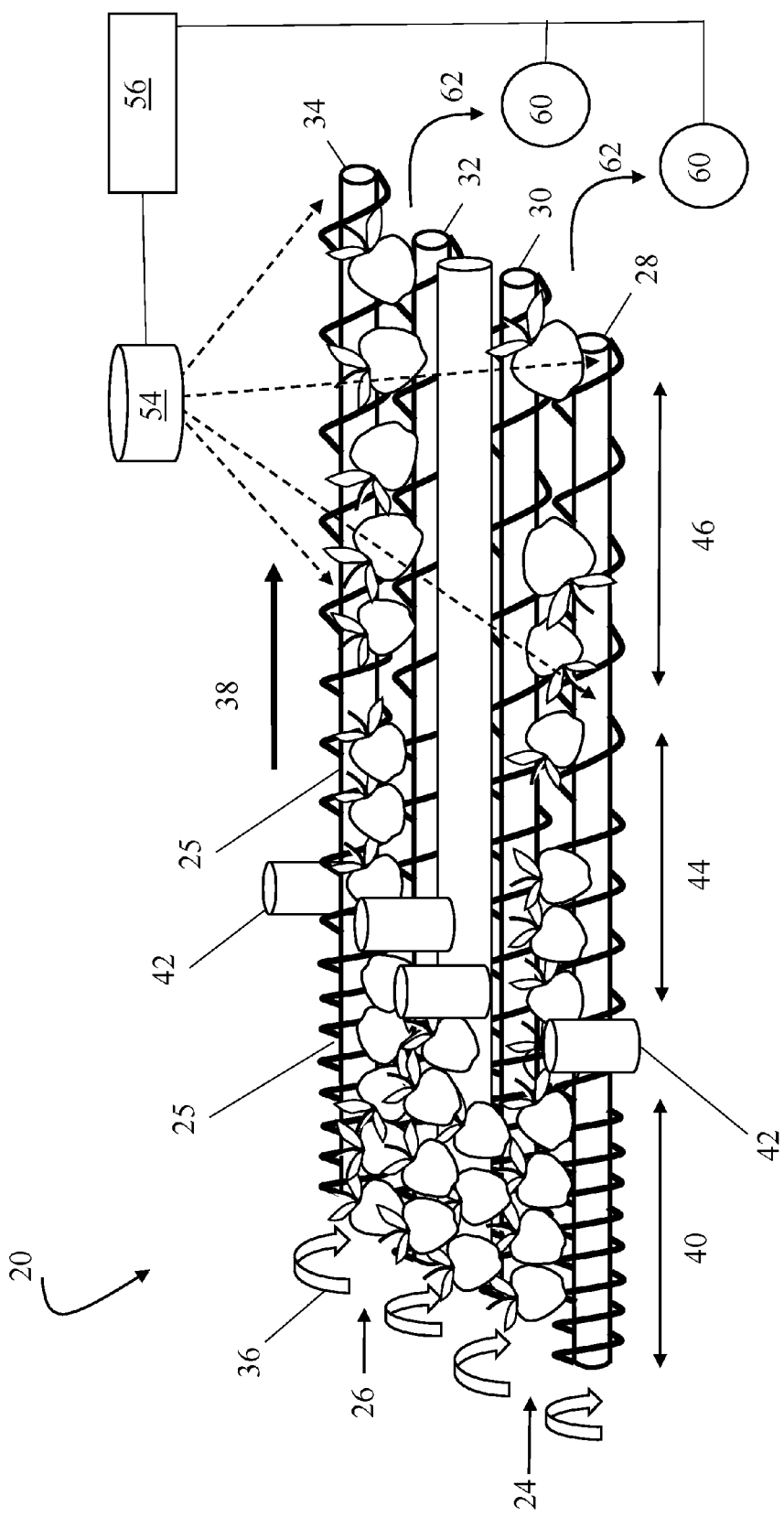
FIG. 2 is an elevational schematic of a fruit singulating system.

FIG. 2 shows an exemplary schematic of an apple singulating section 20. "Singulating" an unorganized group of non-identical objects is a deceptively complex problem. The inventors evaluated multiple systems before succeeding with the singulating system described herein. For the purposes of this disclosure, "singulating" is a process whereby a random group of non-identical objects (such as apples) flows or is urged into a linear tandem arrangement.

Specifically, the apples flow or are urged into slots in a conveyor lane comprising a pair of helical drives 28, 30, 32, 34 and conveyed away from the random group—as shown in FIG. 2.

The singulating section 20 comprises multiple singulating lanes 24, 26. Although FIG. 1 shows the singulating section 20 as having three lanes, for simplicity, only two lanes are shown in FIG. 2. Each singulating lane 24, 26, comprises two helical drives 28, 30, 32, 34 that continuously rotate the apples as the apples move along the lanes 24, 26 in the direction of the arrow 38.

For the purpose of this disclosure, a "helical drive" is defined as a generally round central member with a raised/projecting ridge element that wraps around (i.e. encircles) the central member in a spiral (i.e. helical) pattern/form. The drives shown in FIG. 2 are helical drives 28, 30, 32, 34. A pair of helical drives (for example 28, 30) form a singulating lane 24. In the preferred embodiment, the helical drives 28, 30, 32, 34 rotate in the same direction, as indicated by the directional arrow 36.

As the apples are delivered to the singulating section 20 from the conveyor 12 (shown in FIG. 1), the apples are picked up in a transition area 40 of the singulating section 20

(shown in FIG. 2). The helical drives 28, 30, 32, 34 continuously rotate and thereby urge the apples into "slots" 25 in the helical drive lanes 24, 26. The lane "slots" 25 are the gaps in the paired helical drives 28, 30, 32, 34 designed to accommodate an apple (see FIG. 2). In the transition area 40, the slots 25 are relatively narrow to accommodate a maximum number of apples. As the apples flow onto the lanes 24, 26, flow directors 42 direct errant apples back into lane slots 25. Note that some lane slots 25 may not be filled as the apples advance out of the transition area 40.

The speed of the incoming conveyer 12 (shown in FIG. 1) is coordinated with the rotational speed of the outgoing lanes 24, 26 and the shape and placement of the flow directors 42 to ensure that all apples are successfully directed into lane slots 25. Note that in alternative embodiments, the flow directors 42 may have alternative shapes and placement to facilitate the flow of apples into the lane slots 25. In the preferred embodiment, the helical drives 28, 30, 32, 34 and flow directors 42 have a thick foam padding to minimize bruising of the apples as the apples flow into the transition area 40 and down the lanes 24, 26 in the direction of the arrow 38.

As the apples leave the transition area 40, they flow into an image preparation area 44. Note that FIGS. 1 and 2 are not to scale so that the image preparation area 44 is actually longer than it appears in the figures. In the image preparation area 44, the pitch of the helical elements of the helical drives 28, 30, 32, 34 changes so that the lane slots 25 become wider. The helical drives shown in FIG. 2 are "multistage helical drives". As the apples rotate, the apples migrate to the trailing end of the slots 25—so that the apples are approximately evenly spaced as the apples leave the image preparation area 44 and enter the image chamber area 46.

For the purposes of this disclosure, a "multistage helical drive" is a helical drive wherein the number of revolutions of the helical element around the central core (per linear foot for example) varies so that the pitch of the helical element changes. The practical effect of the multistage helical drives here is that, as the apples move away from the transition area 40, the slots 25 get larger. As mentioned above, the helical drives shown in FIG. 2 are examples of "multistage helical drives".

As best shown in FIGS. 1 and 2, the imaging section 50 comprises a chamber structure 52 and an imaging device 54 positioned within the chamber structure 52. For simplicity, the chamber structure 52 is not shown in FIG. 2. As the helical drives 28, 30, 32, 34 rotate the apples, essentially all surfaces of the apple are exposed within the field of view of the imaging device 54. In the preferred embodiment, the imaging device 54 comprises a charge-coupled device (CCD) camera and artificial lights (for example, light emitting diodes (LEDs)). A processor 56 in communication with the camera 54 assembles the images collected by the camera 54 and identifies/records any defects in the fruit.

In alternative embodiments, the camera/imaging device 54 may also include hyperspectral and/or multispectral lighting and/or filters so that the apples can be effectively illuminated by selected light wave bands. Using known methods and processes, this can enable software associated with the processor 56 to detect feces, bacteria, and other potentially harmful contaminants.

In FIG. 2, the processor 56 is shown schematically as in communication with the camera 54 and a rotary sorter 60. For the purposes of this disclosure, a "rotary sorter" is defined as a multi-compartmental sorter which receives an object (preferably fruit) in one position and rotates to deposit the fruit in a second location based on an input signal from a computer controller and/or processor. The sorters shown in FIGS. 1 and 3-5 are rotary sorters. The use of the rotary sorter is important/critical because the sorter is simple, compact, and dependable, which are all key attributes when operating in a harvest/field environment.

As best shown in FIG. 1, as the apples leave the imaging section 50, the apples move in the direction of the arrow 62 and are deposited in the rotary sorter 60. As best shown in FIGS. 1 and 3-5, the rotary sorter 60 is a multi-compartmental device. In the preferred embodiment, the sorter 60 has a generally round shape with at least four compartments. In alternative embodiments, the sorter may have more or less than four compartments and the shape of the sorter may include non-rounded shapes (for example, a pentagon, hexagon, octagon, etc.).

As the processor 56 processes the images of each apple, the images are scanned for the presence (or absence) of surface defects—and ultimately assigned a quality grade based on the processor 56 evaluation of the apple image. The quality evaluation for each apple is communicated from the processor 56 to the sorter 60 in the form of a data package. The data package also communicates the physical position of the apple relative to a controller associated with the sorter 60. When the apple is deposited in the sorter 60, the sorter rotates and deposits the apple in a bin (or on a conveyor 69, 71 that leads to a bin 72, 68) that collects apples with the assigned quality grade.

Figure 3:
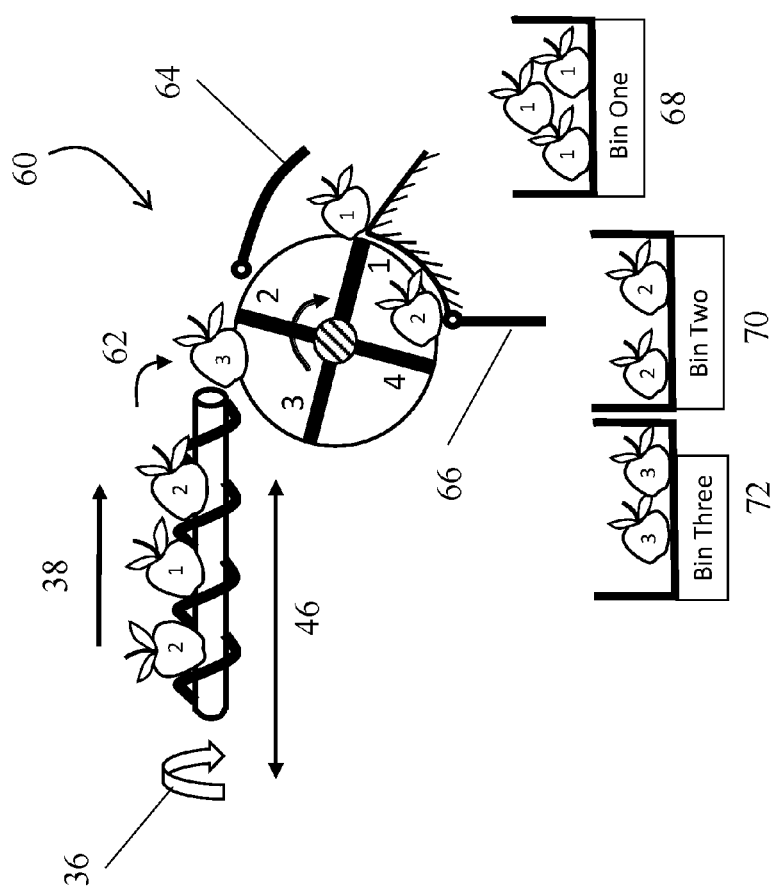
FIG. 3 is a schematic of a rotary sorter showing fruit as it is deposited in a first bin.
Figure 4:
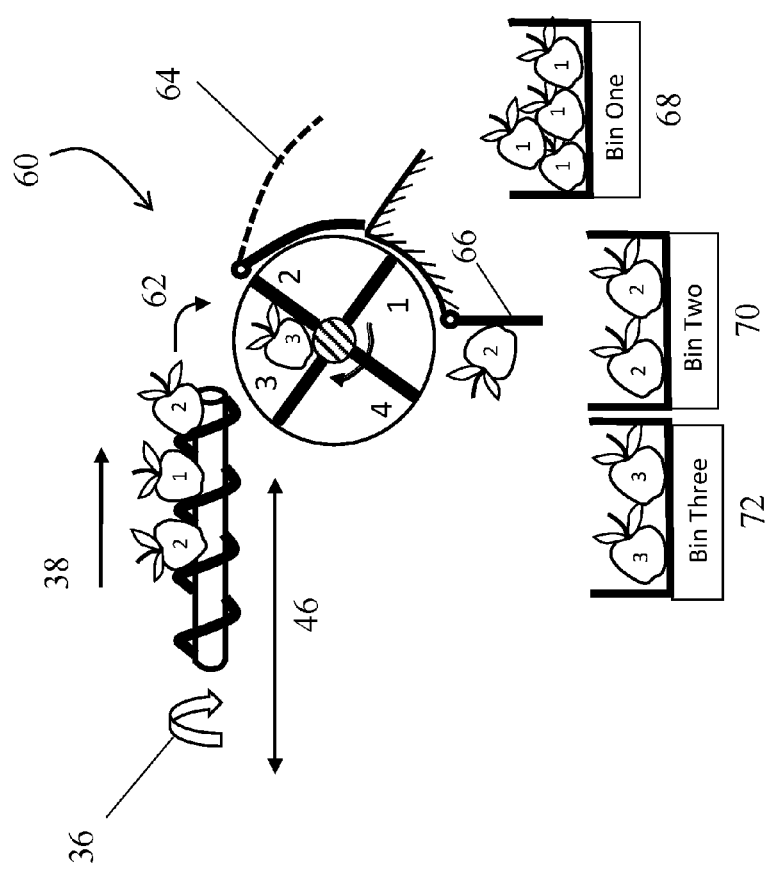
FIG. 4 is a schematic of a rotary sorter showing fruit as it is deposited in a second bin.
Figure 5:
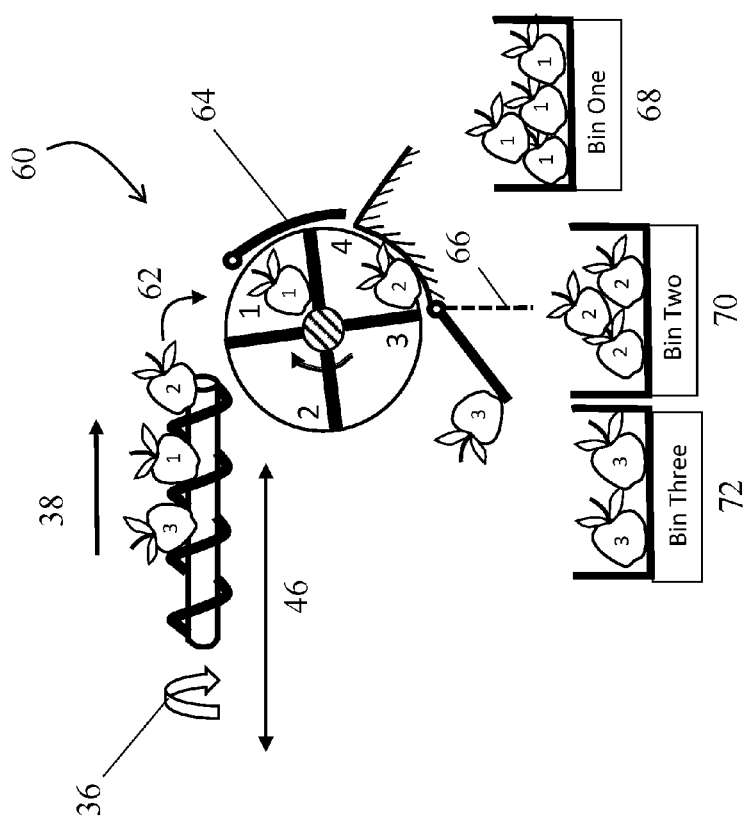
FIG. 5 is a schematic of a rotary sorter showing fruit as it is deposited in a third bin.

FIGS. 3-5 show a simple exemplary rotary sorter 60 comprising four compartments and two gates 64, 66. As shown in FIG. 3, as an apple moves from the image chamber area 46 of the singulating section 20, the apple is deposited in the rotary sorter 60. Simultaneously, a gate 64 opens to deposit another apple in bin one 68, and a second gate 66 moves to a vertical position so that an additional apple is ready for depositing in bin two 70. FIG. 4 shows a configuration wherein one of the gates 64 closes but the second gate 66 opens so that, as an apple is added to the sorter 60, an apple is deposited in bin two 70. FIG. 5 shows a configuration wherein the first gate 64 remains closed and the second gate 66 moves to a diagonal position so that an apple is deposited in a third bin 72.

For the foregoing reasons, it is clear that the method and apparatus described herein provides an innovative machine vision-based apple sorting system. The current system may be modified in multiple ways and applied in various technological applications. For example, although the preferred embodiment is directed to apples, the system may be used for pears, peaches, oranges, nectarines, pomegranates, tomatoes, avocados, plums, onions, lemons, limes, or other fruits and/or vegetables having a shape capable of singulation by the helical drive configuration described herein. Further, although FIGS. 3-5 show the fruit as sorted into three grades using a rotary sorter with four compartments, in alternative embodiments, the sorter may comprise a larger (or smaller) number of fruit quality grades. The ability to sort the fruit into an increased (or decreased) number of bins/fruit quality grades is enabled by increasing (or decreasing) the number of compartments and gates in the sorter.

The disclosed method and apparatus may be modified and customized as required by a specific operation or application, and the individual components may be modified and defined, as required, to achieve the desired result. Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

What is claimed is:

1. A fruit sorting system comprising:
   a pair of helical drives structured to singulate, rotate and transport fruit;
   an imaging device positioned adjacent to the helical drives so that as the helical drives rotate the fruit, the imaging device records images of the fruit;
   a processor structured to receive the images of the fruit from the imaging device and evaluate the images; and,
   a rotary sorter in electrical communication with the processor, the sorter having multiple rotating compartments, each of the compartments selectively rotating around an arc to sort the fruit;
   wherein, after the fruit is deposited in one of the compartments of the sorter, the sorter selectively rotates around the arc to place the fruit in a designated location corresponding with the image evaluation by the processor.

2. The system of claim 1 wherein the system comprises a machine vision system.

3. The system of claim 1 wherein the fruit comprises one of an apple, a pear, a peach, an orange, a nectarine, a pomegranate, a tomato, an avocado, a plum, and/or any other generally rounded fruit or vegetable capable of singulation and rotation by the helical drives.

4. The system of claim 1 wherein the helical drives are structured to be multistage helical drives.

5. The system of claim 1 wherein the helical drives rotate in the same direction.

6. The system of claim 1 wherein the helical drives are multistage helical drives so that the slots formed by the helical drives get larger as fruit moves from one end of the helical drives to the other.

7. The system of claim 1 wherein the system further comprises an image chamber structure, the imaging device being positioned in the image chamber.

8. The system of claim 1 wherein the imaging device is a CCD camera.

9. The system of claim 1 wherein the system is structured so that the fruit falls downwardly from the helical drives into the sorter.

10. The system of claim 1 wherein the sorter comprises a plurality of gates which are structured to open, or partially open to discharge fruit based on the image evaluation.

11. The system of claim 1 wherein the rotary sorter comprises at least 4 compartments.

12. A method of sorting fruit comprising the steps of:
    (a) providing the system of claim 1;
    (b) programming the processor so that the processor assigns a quality grade to the fruit;
    (c) initiating operation of the system by adding fruit to the system so that the helical drives pick up rotate and transport the fruit; and
    (d) sorting the fruit based on the quality grade of the fruit by using a rotary sorter, the sorter having multiple rotating compartments, each of the compartments rotating around a 360° arc to selectively place the fruit in a designated location.

13. A machine vision apple sorter comprising:
    a pair of helical drives that rotate and convey an apple;
    an imaging device that acquires multiple images of the apple that covers the entire surface of the apple; and,
    a processor in communication with the imaging device evaluates each image; and,
    a rotary sorter in communication with the processor, the sorter comprising multiple rotating compartments, each of the compartments selectively rotating around an arc to sort the fruit;
    wherein the sorter is configured to sort the apples based on the processor's evaluation of the apple's image.

14. A method of making a fruit sorting system comprising:
    (a) providing a pair of helical drives structured to singulate fruit;
    (b) positioning an imaging device adjacent to the helical drives so that as the helical drives rotate the fruit, the imaging device records images of the fruit;
    (c) connecting a processor to the imaging device to receive the images of the fruit from the imaging device;
    (d) placing a rotary sorter in electrical communication with the processor, the sorter comprising multiple rotating compartments, each of the compartments selectively rotating around an arc to sort the fruit so that, in operation, the sorter deposits the fruit in a designated location corresponding with an image evaluation by the processor.

15. The method of claim 14 wherein, in step (a), the helical drives are structured to be multistage helical drives.

16. The method of claim 14 wherein, in step (a) the helical drives rotate in the same direction.

17. The method of claim 14 wherein, in step (c), the imaging device is a CCD camera.

18. The method of claim 14 wherein, in step (d), the sorter comprises a plurality of gates which are structured to open, or partially open to discharge fruit based on the image evaluation.

* * * * *